(12) United States Patent
Hirabayashi et al.

(10) Patent No.: US 6,595,697 B2
(45) Date of Patent: Jul. 22, 2003

(54) FERRULE AND OPTICAL CONNECTOR AND METHOD OF MAKING SAME

(75) Inventors: Ken Hirabayashi, Chiba (JP);
Yoshinao Kawashima, Koto-ku (JP);
Takeshi Uchiyama, Chiba (JP);
Hiroyuki Tokita, Koto-ku (JP)

(73) Assignee: Seiko Instruments Inc. (JP)

( * ) Notice: Subject to any disclaimer, the term of this patent is extended or adjusted under 35 U.S.C. 154(b) by 54 days.

(21) Appl. No.: 09/764,789

(22) Filed: Jan. 17, 2001

(65) Prior Publication Data

US 2002/0126961 A1 Sep. 12, 2002

(30) Foreign Application Priority Data

Jan. 17, 2000 (JP) ........................ 2000-008214
Jan. 16, 2001 (JP) ........................ 2001-008214

(51) Int. Cl.⁷ .................................. G02B 6/36
(52) U.S. Cl. .................. 385/78; 385/76; 385/77; 385/55; 385/60; 385/66; 385/84; 385/139

(58) Field of Search ............... 385/55, 60, 65, 385/66, 67, 11, 72, 76, 77, 78, 83, 84, 85, 139

(56) References Cited

U.S. PATENT DOCUMENTS

| | | | | |
|---|---|---|---|---|
| 4,832,435 A | * | 5/1989 | Suzuki et al. | 385/83 |
| 4,907,853 A | * | 3/1990 | Hiratsuka | 385/60 |
| 4,919,509 A | * | 4/1990 | Miller et al. | 385/55 |
| 5,216,733 A | * | 6/1993 | Nagase et al. | 385/60 |
| 5,668,905 A | * | 9/1997 | Takahashi et al. | 385/78 |
| 5,692,081 A | * | 11/1997 | Takahashi | 385/78 |

* cited by examiner

Primary Examiner—Brian Healy
(74) Attorney, Agent, or Firm—Adams & Wilks

(57) ABSTRACT

A ferrule has a tubular body for supporting an end of an optical fiber having a coated end. A holder is disposed at a rear end of the tubular body for supporting the coated end of the optical fiber. A collar member is connected to the holder and has a through-hole through which a portion of the holder extends. A positioning groove is disposed at an outer peripheral surface of the collar member for positioning with respect to an optical connector housing.

37 Claims, 13 Drawing Sheets

FERRULE AND OPTICAL CONNECTOR AND METHOD OF MAKING SAME

BACKGROUND OF THE INVENTION

1. Field of the Invention

The present invention relates to an optical connector for connecting optical fibers, particularly to a ferrule for holding a tip of the optical fiber.

2. Background Information

In coherent optical fiber communication and in optical interference measurement such as that using an optical fiber gyroscope, or in similar applications, a polarization maintaining optical fiber capable of transmitting light while maintaining the orientation of the plane of polarization of the transmission light has widely conventionally been used.

To connect an end of this polarization maintaining optical fiber to an end of another polarization maintaining optical fiber, or to other optical elements, the connection has to be made in a manner that can provide a high extinction ratio transmission. Therefore adjustment has to be made, before the connection, on the angle of the plane of polarization of the polarization maintaining optical fiber, i.e., the angle of rotation about the axis of the optical fiber.

A ferrule into which the polarization maintaining optical fiber is inserted to be held is usually composed of a ferrule tubular body and a collar member. The ferrule tubular body is formed of hard ceramic such as zirconia, or glass or like other materials and has an optical fiber insertion hole. The collar member is provided at the rear end of the ferrule tubular body, and has a coated optical fiber insertion hole that is communicated with the rear end of the optical fiber insertion hole to hold the coated optical fiber. Metals such as stainless steel, plastics, ceramics or the like can be used to form the collar member. The optical fiber insertion hole provided inside the ferrule tubular body receives the optical fiber, namely, the coated optical fiber with its coat removed at the tip, and the optical fiber inserted therein is bonded to the ferrule with an adhesive or the like.

When the optical fiber is bonded to the ferrule, the bonding has to be made only after the orientation of the plane of polarization of the optical fiber is aligned with the position of a ferrule positioning groove with an allowance of ±3°. For that reason, a microscope is used to observe the facet of the optical fiber and adjust the angle of rotation about the axis of the optical fiber, so that the optical fiber can be bonded and fixed to the ferrule tubular body at the appropriate position. The adjustment operation, however, is problematic because it is difficult, lacks precision and takes time.

A ferrule has been proposed in order to eliminate such inconveniences. In this ferrule, its collar member is composed of two separate members. One is a cylindrical holder and the other is an annular collar member which is formed along the outer periphery of the holder and which has a concave portion serving as a positioning key in a housing.

According to this ferrule, an optical fiber is bonded and fixed to a ferrule tubular body to which the holder is fitted and the end face of the ferrule tubular body is polished. The polished end face of the ferrule tubular body (facet of the optical fiber) is observed through a microscope to adjust the angle of rotation about the axis of the optical fiber, and then the collar member is bonded and fixed to the outer peripheral surface of the holder. The orientation of the plane of polarization of the optical fiber thus can be aligned.

Unfortunately, the angle of rotation of the ferrule tubular body is easily shifted as well as the end face thereof in the radial direction when the collar member is to be bonded at an appropriate position while adjusting the orientation of the plane of polarization of the optical fiber.

Moreover, assembly of the proposed ferrule is time consuming because it requires time for an adhesive to cure if the annular cover member is bonded to the holder using the adhesive.

An object of the present invention is therefore to provide a ferrule and an optical connector in which assembly can easily be made with high precision in a shortened period of time.

SUMMARY OF THE INVENTION

The present invention overcomes the drawbacks of the conventional art. In a first aspect, the present invention is directed to a ferrule. In a first embodiment, the ferrule comprises:

a ferrule tubular body for holding an end of an optical fiber;

a holder provided at the rear end of the ferrule tubular body in order to hold a coated optical fiber; and a collar member having a through hole through which the holder can be inserted and, on its outer peripheral surface, a positioning groove for positioning with respect to an optical connector housing, the collar member being welded to or fused with the holder.

In a second embodiment, the holder and the collar member are formed of a metal, and the outer peripheral surface of the holder and the inner peripheral surface of the collar member are fixed to each other by welding.

In a third embodiment, the holder and the collar member are formed of a metal, the holder has a flange portion protruding along the outer peripheral surface thereof like a disc, and the flange portion is fixed to the peripheral edge of the collar member by welding.

In a fourth embodiment, the outer peripheral surface of the collar member and the outer peripheral surface of the holder are fixed to each other by welding.

In a fifth embodiment, the holder has a large diameter cylindrical portion to be fitted to the ferrule tubular body, the flange portion is placed at substantially the center of the large diameter cylindrical portion in the axial direction of the holder, and the collar member is fixed to the flange portion on the ferrule tubular body side.

In a sixth embodiment, the flange portion is placed along the outer periphery of an end of the holder on the ferrule tubular body side, and the collar member is fixed to the flange portion on the side opposite to the ferrule tubular body.

In a seventh embodiment, the holder and the collar member are formed of a resin, the holder has a first tapered portion whose outer diameter is gradually reduced toward its rear end, the through hole of the collar member has a second tapered portion whose inner diameter is gradually increased toward the opening into which the holder is inserted, and the holder and the collar member are fixed to each other by deposition between the first tapered portion and the second tapered portion.

In an eighth embodiment, the optical fiber comprises a polarization maintaining optical fiber.

In another aspect, the present invention is directed to an optical connector utilizing the ferrule according to any one of the first to eighth embodiments of the invention.

In another aspect, the present invention is directed to a method of manufacturing a ferrule, comprising the steps of:
fitting a holder for holding a coated optical fiber to the rear end of a ferrule tubular body for holding an end of an optical fiber; and
welding to or fusing with the holding unit a collar member having a through hole through which the holder can be inserted, the collar member also having on its outer peripheral surface a positioning groove for positioning with respect to an optical connector housing.

In a first embodiment of the method of manufacturing a ferrule according to the invention, the holder and the collar member are formed of a metal, and the outer peripheral surface of the holder and the inner peripheral surface of the collar member are fixed to each other by welding.

In a second embodiment of the method of manufacturing a ferrule according to the invention, the holder and the collar member are formed of a metal,
the holder has a flange portion protruding along the outer peripheral surface thereof like a disc, and the flange portion is fixed to the peripheral edge of the collar member by welding.

In a third embodiment of the method of manufacturing a ferrule according to the invention, the outer peripheral surface of the collar member and the outer peripheral surface of the holder are welded to each other.

In a fourth embodiment of the method of manufacturing a ferrule according to the invention, the holder have a large diameter cylindrical portion to be fitted to the ferrule tubular body, the flange portion is placed at substantially the center of the large diameter cylindrical portion in the axial direction of the holder, and
the flange portion is inserted through the collar member from the ferrule tubular body side of the flange portion and is welded to the collar member.

In a fifth embodiment of the method of manufacturing a ferrule according to the invention, the flange portion is placed along the outer periphery of an end of the holder on the ferrule tubular body side, and
the flange portion is inserted through the collar member from the side opposite to the ferrule tubular body and is welded to the collar member.

In a sixth embodiment of the method of manufacturing a ferrule according to the invention,
the holder and the collar member are formed of a resin,
the holder has a first tapered portion whose outer diameter is gradually reduced toward its rear end,
the through hole of the collar member has a second tapered portion whose inner diameter is gradually increased toward the opening into which the holder is inserted, and
the holder and the collar member are fixed to each other by fusion between the first tapered portion and the second tapered portion.

In a seventh embodiment, a method of assembling an optical fiber comprises the steps of:
fitting a holder having a flange on its outer periphery to the rear end of a ferrule tubular body;
bonding and fixing an optical fiber thereto;
polishing an end face of the ferrule tubular body;
observing the ferrule tubular body through a microscope to adjust the angle of rotation about the axis of the optical fiber; and
welding to or fusing with the flange a collar member that has a positioning groove.

In an eighth embodiment, in the method of assembling an optical fiber according to the seventh embodiment of the invention the adjustment of the angle of rotation is made by transmitting light through the optical fiber.

In a ninth embodiment, in the method of assembling an optical fiber according to the seventh embodiment of the invention, the optical fiber is a polarization maintaining optical fiber.

In a tenth embodiment, in the method of assembling an optical fiber according to the ninth embodiment of the invention, the adjustment of the angle of rotation is made based on the position of a core of the polarization maintaining optical fiber and the position of stress imparting portions.

In an eleventh embodiment, in the method of assembling an optical fiber according to the tenth embodiment of the invention, the position of the core of the polarization maintaining optical fiber and the position of the stress imparting portions are obtained from a plurality of straight lines each of which is tangential to the stress imparting portions and intersects with the rest of the lines in the view field of the microscope, and from the position of the center of the core.

In a twelfth embodiment, in the method of assembling an optical fiber according to the tenth embodiment of the invention, the position of the core of the polarization maintaining optical fiber and the position of the stress imparting portions are obtained from a plurality of parabolas each of which is tangential to the stress imparting portions and intersects with the rest of the parabolas in the view field of the microscope, and from the position of the center of the core.

In a thirteenth embodiment, in the method of assembling an optical fiber according to the tenth embodiment of the invention, the position of the core of the polarization maintaining optical fiber and the position of the stress imparting portions are obtained from a plurality of hyperbolas each of which is tangential to the stress imparting portions and intersects with the rest of the hyperbolas in the view field of the microscope, and from the position of the center of the core.

In a fourteenth embodiment, in the method of assembling an optical fiber according to the seventh embodiment of the invention, the microscope is at least one microscope selected from the group consisting of a phase contrast microscope, a differential interference microscope, a laser microscope, and a scanning tunneling microscope.

In a fifteenth embodiment, in the method of assembling an optical fiber according to the ninth embodiment of the invention, the angle of rotation is adjusted based on image recognition of the image observed through the microscope and based on adjustment of the relative position of an angle formed by the collar member and a support portion.

In a sixteenth embodiment, a method of assembling an optical fiber comprises the steps of:
fitting a holder having a flange on its outer periphery to the rear end of a ferrule tubular body;
bonding and fixing an optical fiber thereto;
polishing an end face of the ferrule tubular body;
adjusting the angle of rotation about the axis of the optical fiber such that the maximum extinction ratio can be obtained; and
welding to or fusing with the flange a collar member that has a positioning groove.

In a seventeenth embodiment, a method of assembling an optical fiber comprises the steps of:

fitting a holder having a flange on its outer periphery to the rear end of a ferrule tubular body;

bonding and fixing a polarization maintaining optical fiber thereto;

polishing an end face of the ferrule tubular body;

disposing a collar member in a light source through a polarizer;

arranging, through an analyzer, an optical power meter in an end of the optical fiber which is not provided with the ferrule tubular body;

adjusting the angle of rotation of the optical fiber about the axis of the optical fiber based on the output of the optical power meter; and welding to or fusing with the flange the collar member that has a positioning groove.

In an eighteenth embodiment, the method of assembling an optical fiber according to the seventeenth embodiment of the invention, further comprises a step of rotating the analyzer to obtain the extinction ratio and adjust the angle.

According to the present invention, the holder and the collar member are fixed to each other by welding or fusion. This makes it possible to facilitate the adjustment of the position of the plane of polarization of the optical fiber held by the ferrule tubular body with respect to the position of the groove of the collar member, as well as to shorten the time required for the assembly.

DETAILED DESCRIPTION OF THE PREFERRED EMBODIMENTS

The present invention will be described in detail below in accordance with embodiments of the invention.

Figure 1:
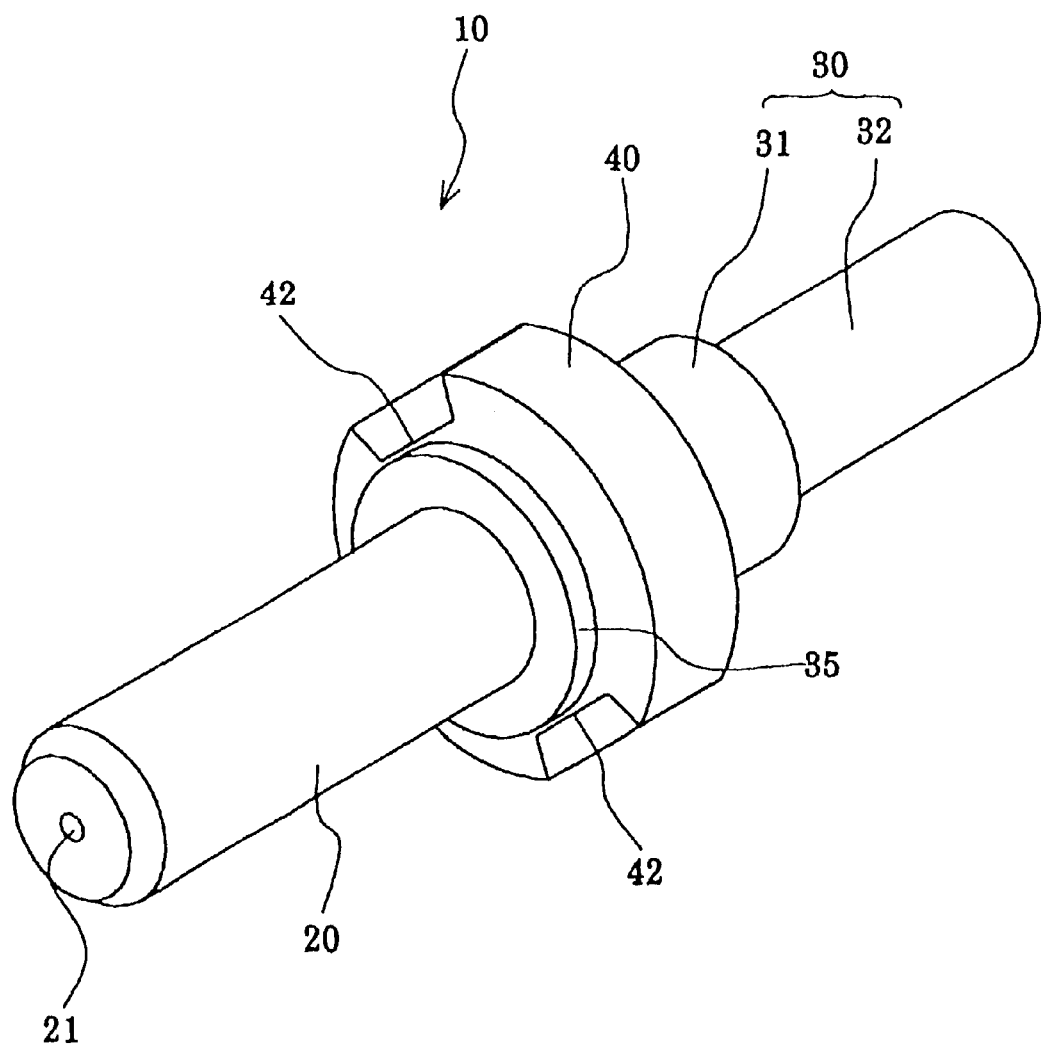
FIG. 1 is an exploded perspective view showing a ferrule according to an embodiment of the present invention.
Figure 2:
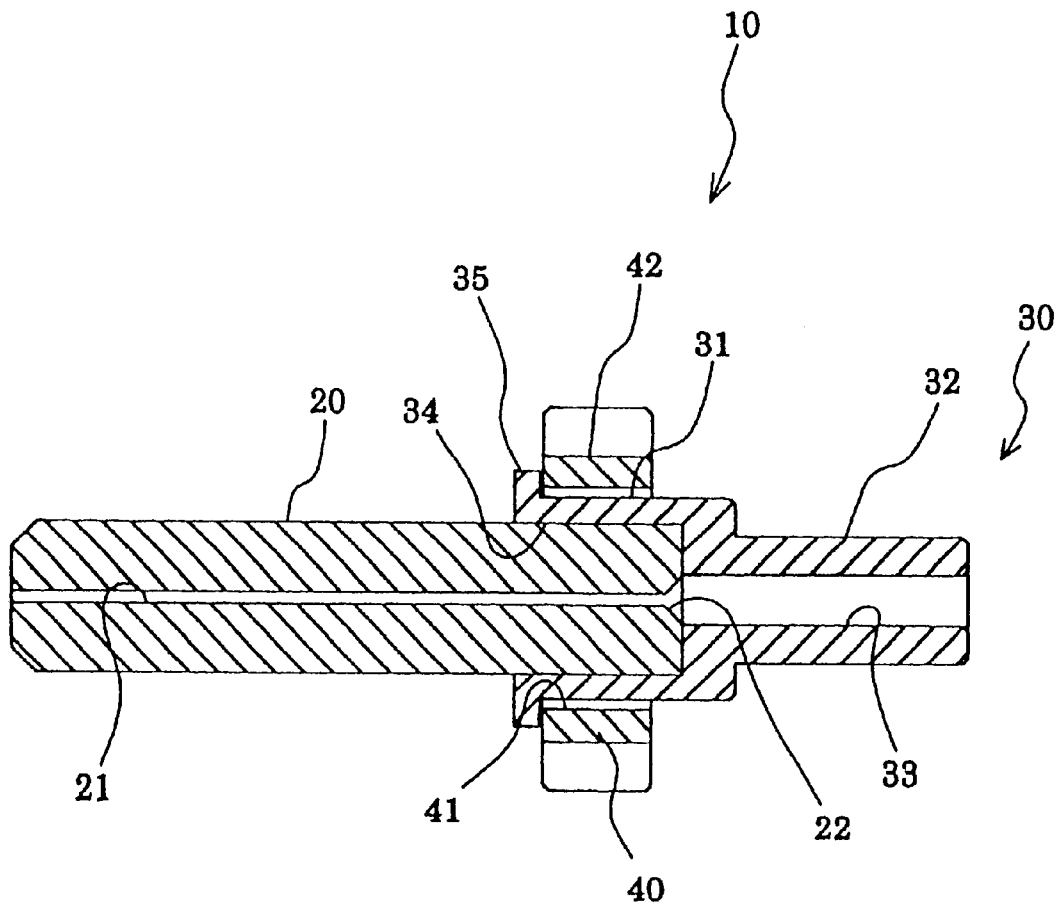
FIG. 2 is a sectional view of the ferrule according to the embodiment of the present invention shown in FIG. 1.

FIG. 1 is an exploded perspective view of a ferrule according to an embodiment of the invention and FIG. 2 is a sectional view of the ferrule.

As shown in FIGS. 1 and 2, a ferrule 10 according to this embodiment is composed of a ferrule tubular body 20 made of ceramics such as zirconia, a metal holder 30 to be fitted to the rear end of the ferrule tubular body 20, and a metal collar member 40 provided on the outer peripheral surface of the holder.

The ferrule tubular body 20 is shaped into a cylinder and has therein an optical fiber insertion hole 21 into which an optical fiber can be inserted to pierce the ferrule tubular body in the axial direction. The rear end of the optical fiber insertion hole 21 forms a tapered portion 22 whose inner diameter is gradually increased toward the opening.

The holder 30 is a metal cylinder consisting of a large diameter cylindrical portion 31 around which the collar member 40 is to be fitted and a small diameter cylindrical portion 32 that has an outer diameter slightly smaller than that of the large diameter cylindrical portion 31 and holds therein a coated optical fiber obtained by coating the outer periphery of an optical fiber.

The holder 30 has a coated optical fiber insertion hole 33 which is communicated with the optical fiber insertion hole 21 and into which a coated optical fiber can be inserted to pierce the holder 30 in the axial direction. A portion of the coated optical fiber insertion hole 33 which is on the large diameter cylindrical portion 31 side is a large diameter portion 34 to be fitted with the rear end of the ferrule tubular body 20. The large diameter portion 34 receives the rear end of the ferrule tubular body 20 press-fitted thereto.

The large diameter cylindrical portion 31 has on its front peripheral edge a flange 35 along the circumference of the holder 30. The flange 35 restricts the movement of the collar member 40 toward the front end in the axial direction, which will be described later, and is welded to the peripheral edge of the collar member 40.

On the other hand, the collar member 40 is shaped into a ring with a through hole 41 whose inner diameter is slightly larger than the outer diameter of the large diameter cylindrical portion 31 of the holder 30 that is to be inserted through the through hole 41. The collar member 40 has on its outer peripheral surface two concave portions 42 to be engaged with engaging projections 84 of a plug frame 82, which will be described later.

The holder 30 and the collar member 40 are fixed to each other by welding the surface of the flange 35 on the collar member 40 side to the peripheral edge of the through hole 41 of the collar member 40 on the holder 30 side.

Now, a detailed description is given on an assembling method for setting an optical fiber in the ferrule 10.

Figure 3A:
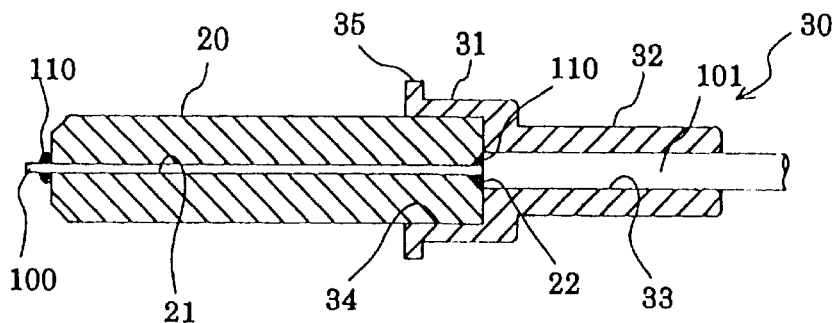
FIGS. 3A–3B are sectional views and FIG. 3C is a top view of a process of assembling an optical fiber and the ferrule according to the embodiment of the present invention shown in FIGS. 1 and 2.
Figure 3B:
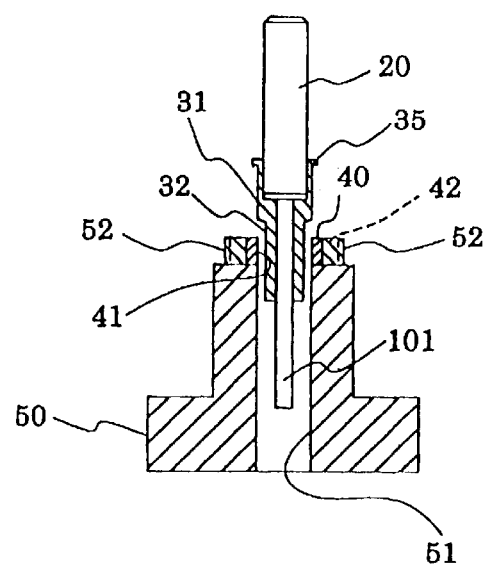
Figure 3C:
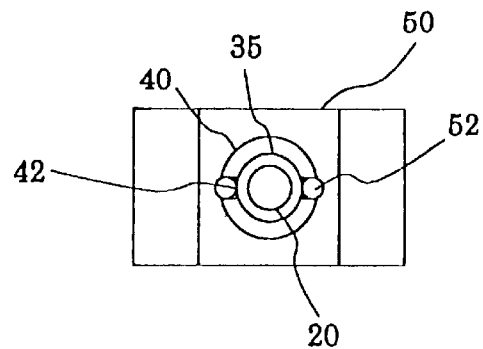

FIGS. 3A to 3C are diagrams showing the method of assembling the optical fiber and the ferrule in accordance with this embodiment, in which FIGS. 3A and 3B are sectional views of the ferrule and an assembly jig and FIG. 3C is a top view thereof.

As shown in FIG. 3A, according to this embodiment, the holder 30 is fitted to the rear end of the ferrule tubular body 20, the optical fiber insertion hole 21 and the coated optical fiber insertion hole 31 are filled in advance with, for example, a thermally curable adhesive 110, and a coated optical fiber 101 and an optical fiber 100 obtained by peeling off a predetermined amount of coating are inserted into the respective insertion holes. The adhesive 110 is then thermally set using a heater or the like, whereby the optical fiber 100 and the coated optical fiber 101 are held in the ferrule tubular body 20 and the holder 30, respectively.

Subsequently, as shown in FIGS. 3B and 3C, the end face of the ferrule tubular body 20 and the facet of the optical fiber 100 are polished to have smooth mirror finished surfaces. Then the optical fiber and the ferrule are placed on a seating 50 that serves as the earth in welding.

The seating 50 has a holder insertion hole 51 whose inner diameter is substantially the same as the outer diameter of the large diameter portion 31 of the holder so that the holder can be inserted therein. The end of the seating 50 where the holder insertion hole 51 is opened is provided with two positioning pins 52 to be fitted to the two concave portions 42 of the collar member 40. The positioning pins 52 are arranged such that the center of the through hole 41 of the collar member 40 coincides with the center of the holder insertion hole 51. Being fitted with the two concave portions 42, the positioning pins 52 restrict the radial movement of the collar member 40.

The holder 30 combined with the ferrule tubular body 20 is held by the seating 50 thus structured. To be more specific, the positioning pins 52 of the seating 50 are engaged with the collar member 40 through which the optical fiber 100 is inserted in advance, and the holder 30 is inserted through the through hole 41 of the collar member 40 and into the holder insertion hole 51 of the seating 50. The flange 35 of the holder 30 is thus brought into contact with the peripheral edge of the collar member 40, whereby the holder 30 is restricted in its radial and axial movement (downward movement in the drawing) to be held to the seating 50.

Figure 4A:
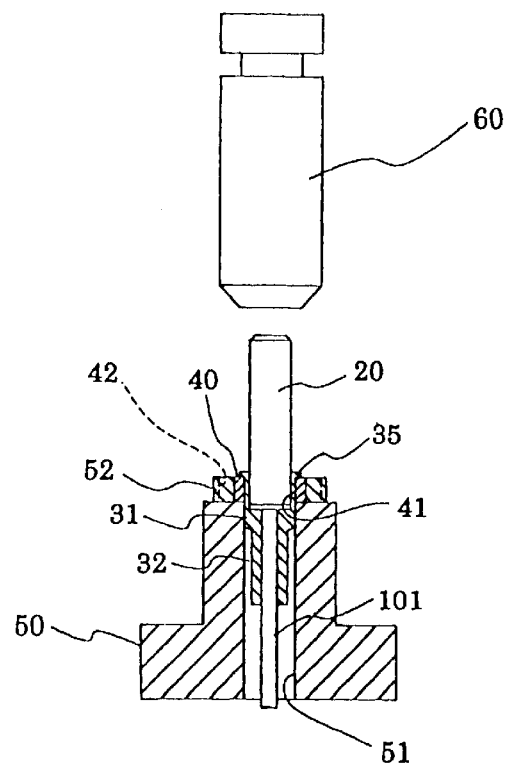
FIG. 4A is a partial sectional view and FIG. 4B is a top view illustrating an example of observing the ferrule according to the embodiment of the present invention shown in FIGS. 1 and 2.
Figure 4B:
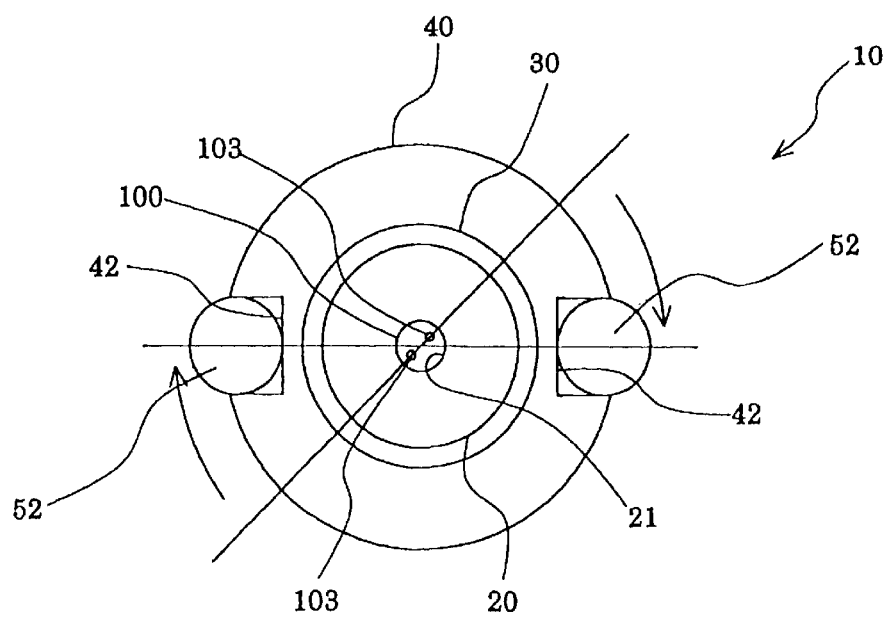

Next, a plane of polarization is observed using a measurement device 60 such as a microscope as shown in FIG. 4A. FIG. 4B shows an example of observing the plane of polarization.

As shown in FIG. 4B, two stress imparting portions 103 are observed in the facet of the optical fiber 100. The adjustment is made by rotating the holder 30 about its axis until the line connecting the center of the two stress imparting portions 103 coincides with the line connecting the two concave portions 42 of the collar member 40.

Figure 5:
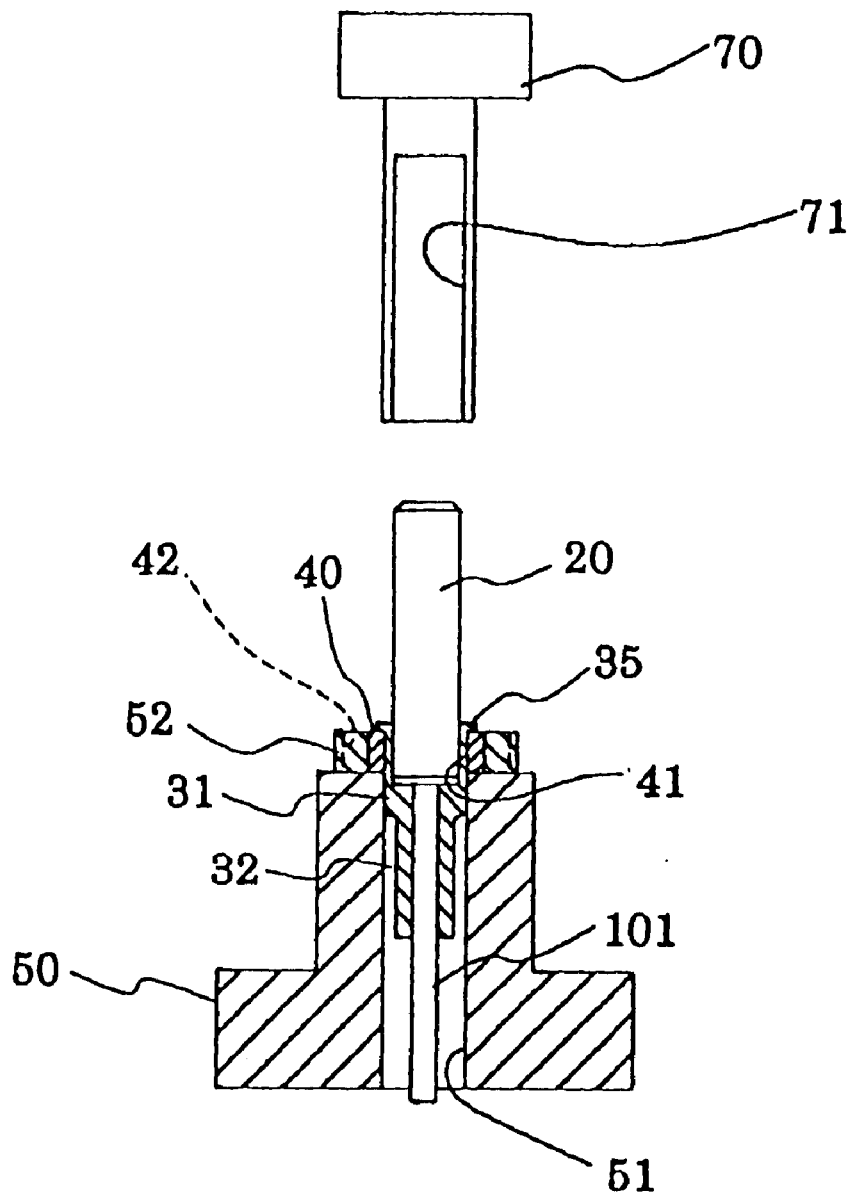
FIG. 5 is a partial sectional view of the ferrule according to the embodiment of the present invention shown in FIGS. 1–2 and shows an assembly jig used in a process of assembling the optical fiber and the ferrule.

Thereafter, the flange 35 and the collar member 40 are fixed to each other by welding as shown in FIG. 5. In this embodiment, the flange 35 is welded to the collar member 40 by spot welding using a welding electrode 70. The welding electrode 70 has a ferrule insertion hole 71 having an inner diameter slightly larger than the outer diameter of the ferrule tubular body 20. The ferrule tubular body 20 is inserted into the ferrule insertion hole 71 to bring an end thereof into contact with the flange 35. Thus the flange 35 and the collar member 40 are readied for fixing by welding.

Welding other than spot welding may be used to weld the flange 35 and the collar member 40. For instance, the flange 35 and the collar member 40 may be fixed to each other by laser welding.

As has been described, the holder 30 and the collar member 40 are bonded and fixed to each other after aligning the line connecting the center of the stress imparting portions 103 with the line connecting the two concave portions 42 of the collar member 40. Therefore, when the ferrule 10 is incorporated into an optical connector plug 50 which will be discussed later, the line connecting the two engaging projections 84 provided in the plug frame 82 coincides with the line connecting the two stress imparting portions 103 of the ferrule tubular body 20, thereby making it possible to align the orientation of the plane of polarization upon face-to-face connection of the optical fiber 100.

In this embodiment, the collar member 40 for adjusting the orientation of the plane of polarization of the ferrule 10 holding the optical fiber 100 is fixed by spot-welding the collar member 40 to the flange 35 as described above. Therefore it is easy to adjust the position of the plane of polarization of the optical fiber held in the ferrule tubular body 20 with respect to the position of the concave portions 42 of the collar member 40, and time required for assembly can be shortened as well.

Figure 6A:
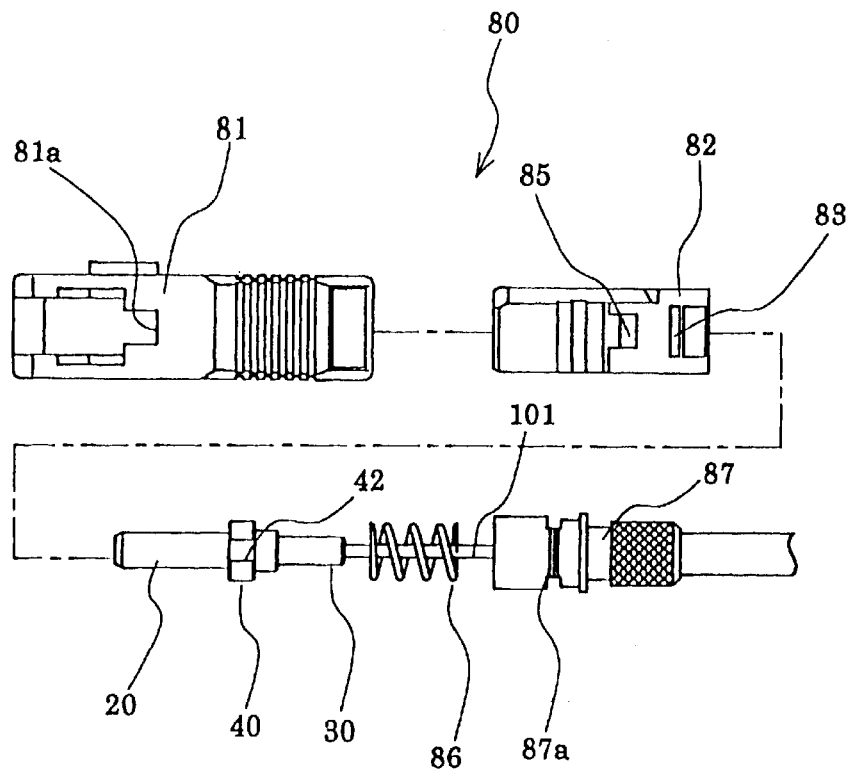
FIGS. 6A and 6B are a plan view and a sectional view, respectively, of an optical connector plug according to the embodiment of the present invention shown in FIGS. 1–2.
Figure 6B:
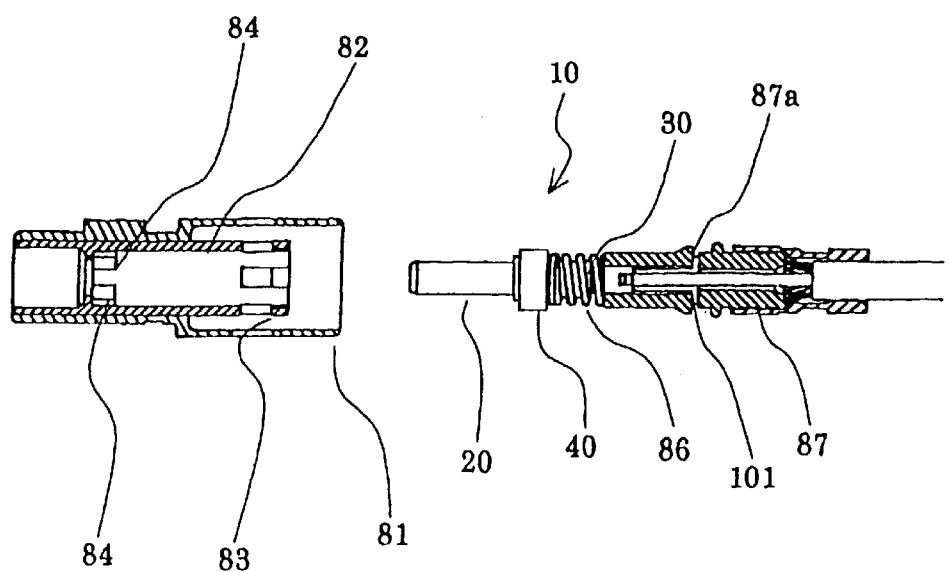

Described next is the optical connector plug provided with the above ferrule 10, and an adapter. FIGS. 6A and 6B show a plan view and a sectional view of the optical connector plug, respectively, and FIG. 7 shows a schematic perspective view of the adapter.

Figure 7:
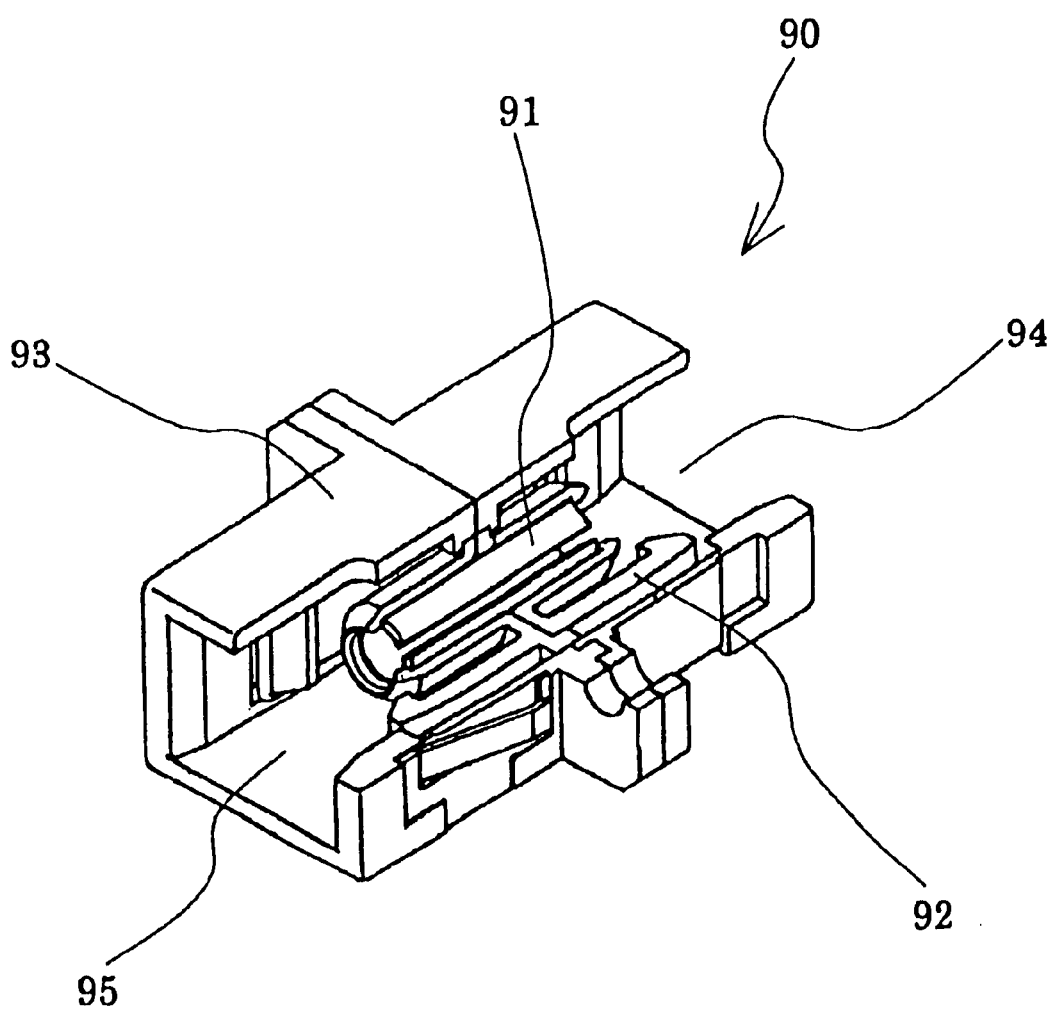
FIG. 7 is a partially cut-off perspective view of an adapter according to an embodiment of the present invention.

The optical connector shown in FIGS. 6a and 6B and FIG. 7 is an Sc type optical connector. The SC type optical connector is composed of an SC type optical connector plug 80 provided with the above ferrule and an Sc type optical connector adapter 90 enclosing therein the SC type optical connector plug 80 from two opposing directions so that the plug is fitted to the adapter.

As shown in FIGS. 6A and 6B, the SC type optical connector plug 80 is provided with an SC type plug housing 81 to be fitted to the SC type optical connector adapter 90 and the SC type plug frame 82 to be fitted in the plug housing 81. The plug frame 82 has therein: the above ferrule 10 composed of the ferule tubular body 20, the holder 30 and the collar member 40; a compression spring 86 to be mounted to the outer periphery of the rear end of the holder 30; and a stopper 87 to be fitted to the rear end of the holder 30 through the compression spring 86.

The plug frame 82 receives the ferrule 10 holding the optical fiber 100 in the aforementioned manner, the compression spring 86 with the optical fiber 100 inserted therein in advance and the stopper 87, which are inserted in the plug frame 82 successively. An engagement claw 87a of the stopper 87 is engaged with an engagement hole 83 of the plug frame 82, so that the stopper 87 is fixed to the plug frame 82. As a result, the ferrule 10 is held in the plug frame 82 through the compression spring 86 while being biased in the axial direction. The ferrule 10 held in the plug frame 82 is restricted in its rotation by engagement of the concave portions 42 provided in the collar member 40 with the engaging projections 84 provided in the plug frame 82.

The plug frame 82 has on its outer periphery an engaging convex portion 85 for engagement with the plug housing 81. Being engaged with an engaging concave portion 81a of the plug housing 81, the engaging convex portion 85 holds the plug frame 82 in the plug housing 81.

On the other hand, as shown in FIG. 7, the optical connector adapter 90 has a built-in optical connection sleeve 91. The optical connection sleeve 91 is for optically coupling the optical fiber 100 to another optical fiber 100 by arranging face to face one ferrule 10 and another ferrule 10, each of which has the optical fiber 100 incorporated therein. The optical connection sleeve 91 is held by a sleeve holder 92 cut in half in the axial direction. The sleeve holder 92 is held in turn by a housing 93 cut in half in the axial direction.

With the thus structured adapter, the optical connection is made by respectively inserting into its openings 94 and 95 the optical connector plug 80 having the above ferrule 10 and another optical connector plug 80 having the above ferrule 10 so that the end faces of the ferrule 10 and the other ferrule 10 are abutted against each other in the optical connection sleeve 91.

The ferrule 10 is restricted in its rotation by engagement of the concave portions 42 of the collar member 40 with the engaging projections 84 of the plug frame 82. Therefore the orientation of the plane of polarization of the optical fiber 100 is determined by the position in the circumferential direction of the concave portions 42 formed in the collar member 40 of the ferrule 10.

Note that the present invention is not limited to this embodiment in which the holder 30 and the collar member 40 are fixed to each other by welding the flange 35 to the peripheral edge of the collar member 40. For example, they may be fixed by welding the outer peripheral surface of the holder 30 and the inner peripheral surface of the collar member 40 by other welding methods such as laser welding.

Figure 8:
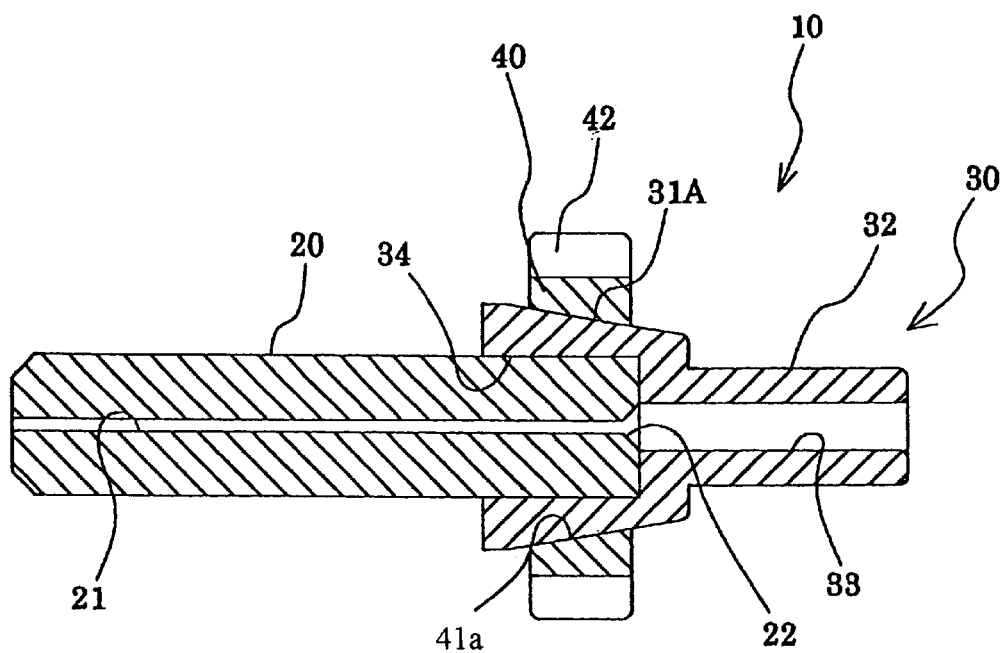
FIG. 8 is a sectional view of a ferrule according to another embodiment of the present invention.

In the embodiment described above with reference to FIGS. 1, 2 and 3A–3C, the holder 30 and the collar member 40 are made of a metal and the flange 35 is fixed to the collar member 40 by welding. On the other hand, in another embodiment the holder 30 and the collar member 40 are made of a resin, and fusion is employed to fix the holder 30 and the collar member 40 to each other. FIG. 8 is a sectional view of a ferrule according to this embodiment of the present invention. The components having the same functions as those described above for the embodiment of FIGS. 1, 2 and 3A–3C are denoted by the same reference symbols, and explanations thereof that would be repetitive are omitted.

As shown in FIG. 8, the holder 30 of this embodiment has a tapered large diameter cylindrical portion 31A whose outer diameter is gradually reduced toward the rear end, and a small diameter cylindrical portion 32 integral with the rear end of the large diameter cylindrical portion. A through hole 41A corresponding to the through hole 41 of the collar member 40 in the embodiment of FIGS. 1, 2 and 3A–3C is a tapered hole whose diameter is gradually increased toward the opening from which the holder 30 is to be inserted. The outer diameter of the large diameter cylindrical portion 31A and the inner diameter of the through hole 41A are of values that allow the large diameter cylindrical portion 31A and the through hole 41A to restrict movement of the inserted holder in the insertion direction by being abutted against each other.

The holder 30 and the collar member 40 are made of a resin in this embodiment. Therefore the holder 30 and the collar member 40 are fixed to each other by inserting the holder through the through hole 41A of the collar member 40, bringing the large diameter cylindrical portion 31A into contact with the through hole 41A, and conducting fusion such as ultrasonic fusion on the through hole 41A and the large diameter cylindrical portion 31A.

As described above, the holder 30 and the collar member 40 are formed of a resin, the large diameter cylindrical portion 31A of the holder 30 is tapered, and the through hole 41A of the collar member 40 takes a form of tapered through hole in this embodiment. Therefore by conducting fusion on the large diameter cylindrical portion 31A and the through hole 41A, the adjustment can easily be made on the position of the plane of polarization of the optical fiber held in the ferrule tubular body 20 with respect to the position of the concave portions 42 of the collar member 40, and the time required to assemble can be shortened as well.

Figure 9:
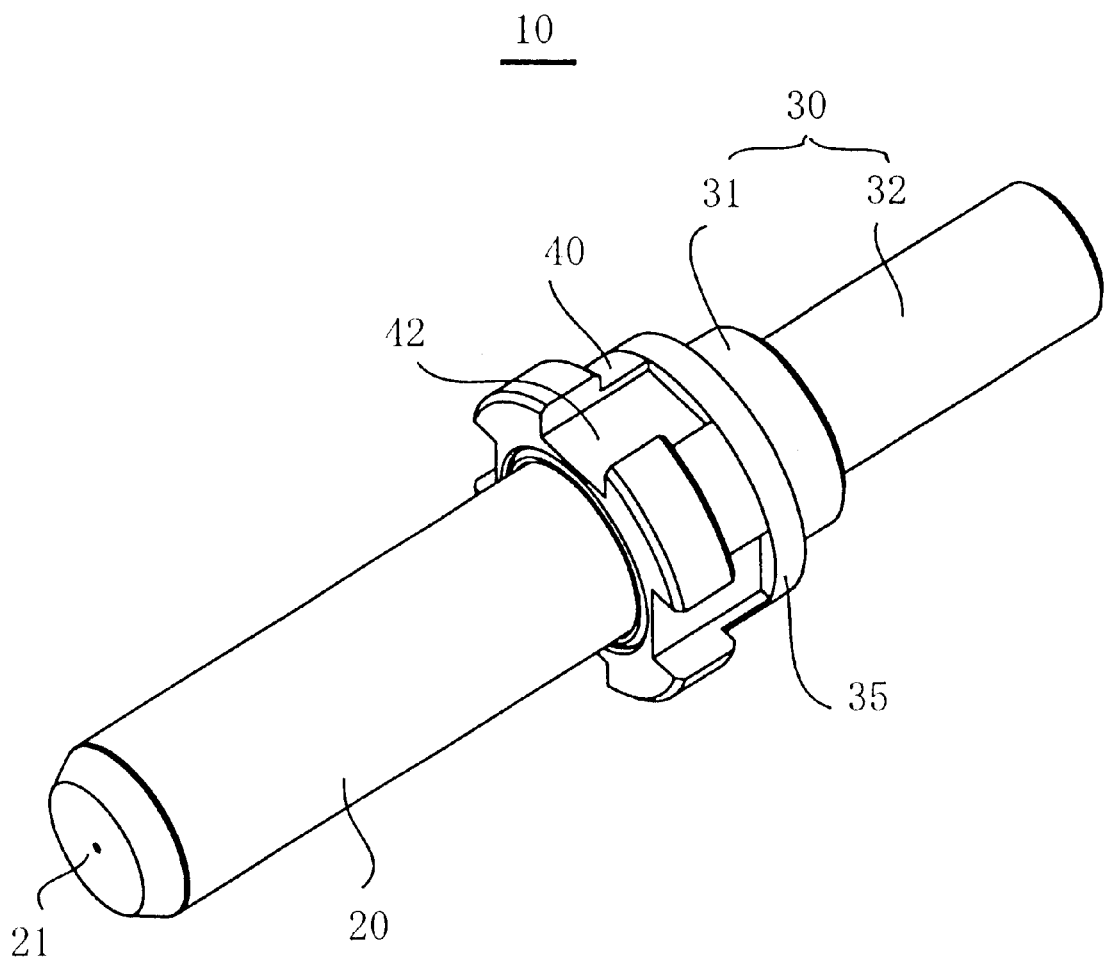
FIG. 9 is a perspective view of a ferrule according to another embodiment of the present invention.

FIG. 9 is a perspective view of a ferrule according to another embodiment of the invention. As shown in the drawing, a ferrule 10 according to this embodiment is composed of a ferrule tubular body 20 made of ceramics such as zirconia, a metal holder 30 to be fitted to the rear end of the ferrule tubular body 20, and a metal collar member 40 provided on the outer peripheral surface of the holder.

The ferrule tubular body 20 is shaped into a cylinder and has therein an optical fiber insertion hole 21 into which an optical fiber can be inserted to pierce the ferrule tubular body in the axial direction.

The holder 30 is a metal cylinder consisting of a large diameter cylindrical portion 31 around which the collar member 40 is to be fitted and a small diameter cylindrical portion 32 that has an outer diameter slightly smaller than that of the large diameter cylindrical portion 31 and holds therein a coated optical fiber obtained by coating the outer periphery of an optical fiber.

The large diameter cylindrical portion 31 has on its front peripheral edge a flange 35 along the circumference of the holder 30. The flange 35 restricts the movement of the collar member 40 toward the front end in the axial direction, and is welded to the peripheral edge of the collar member 40.

On the other hand, the collar member 40 is shaped into a ring with a through hole 41 whose inner diameter is slightly larger than the outer diameter of the large diameter cylindrical portion 31 of the holder 30 that is to be inserted through the through hole. The collar member 40 has on its outer peripheral surface four concave portions 42 to be engaged with engaging projections 84 of a plug frame 82.

The holder 30 and the collar member 40 are fixed to each other by welding with YAG laser the surface of the flange 35 on the collar member 40 side to the peripheral edge of the collar member 40 on the holder 30 side.

Figure 10:
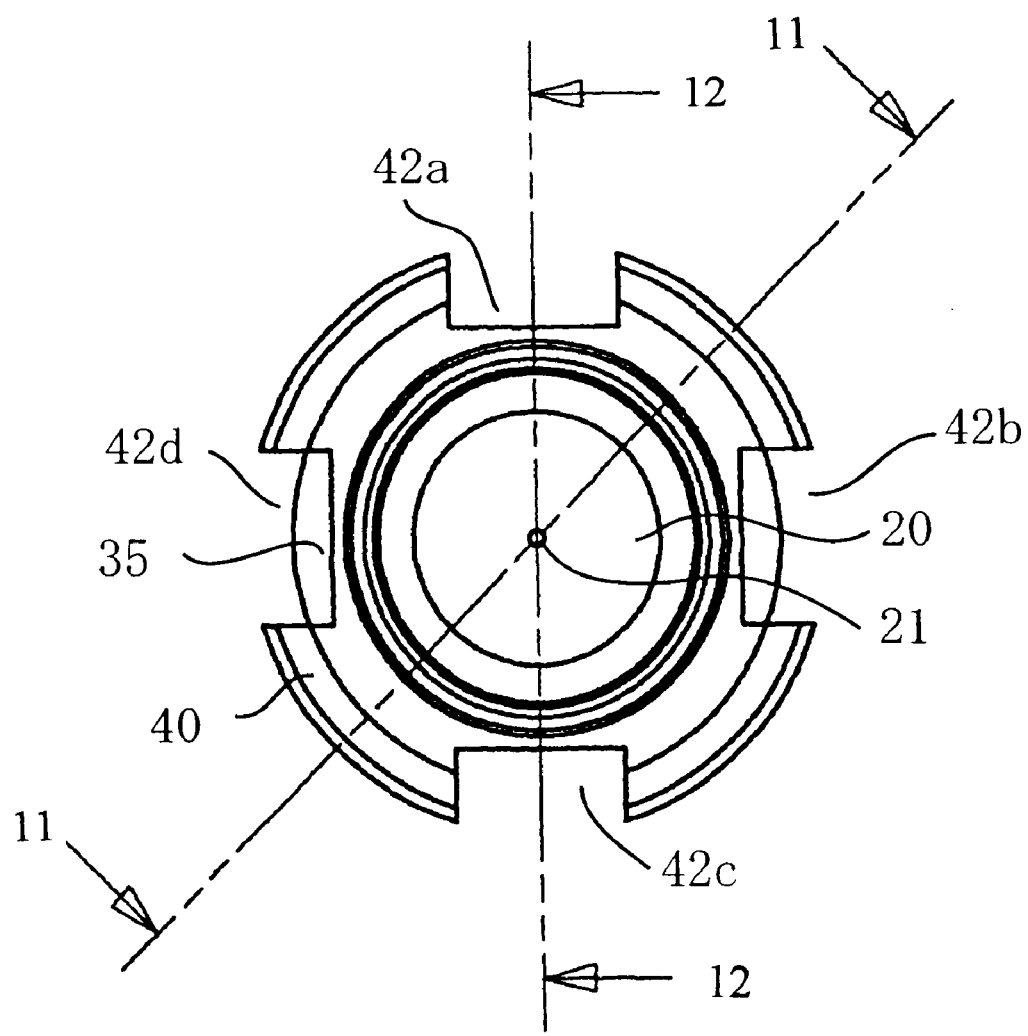
FIG. 10 is a plan view of the ferrule shown in FIG. 9.

FIG. 10 is a plan view of the ferrule 10 viewed from the front end side of the ferrule tubular body 20. In FIG. 10, concave portions 42a, 42b, 42c, and 42d are placed in the direction of twelve o'clock, three o'clock, six o'clock, and nine o'clock, respectively, along the circumference of the collar member 40. The flange 35 peeps out over the concave portions 42. Here, the flange 35 is circular but parts of its outer periphery are omitted in the drawing at the concave portions 42a and 42c. The ferrule tubular body 20 having at its center the optical fiber insertion hole 21 is placed in the center of the ferrule 10.

Although four of the concave portions 42 are provided in this embodiment, the present invention is not limited thereto. The concave portions 42 may be two arranged symmetrically with respect to the optical fiber insertion hole 21, e.g., the concave portions 42a and 42c, or may be three arranged such that the angular interval between every adjacent two concave portions is 120°.

Figure 11:
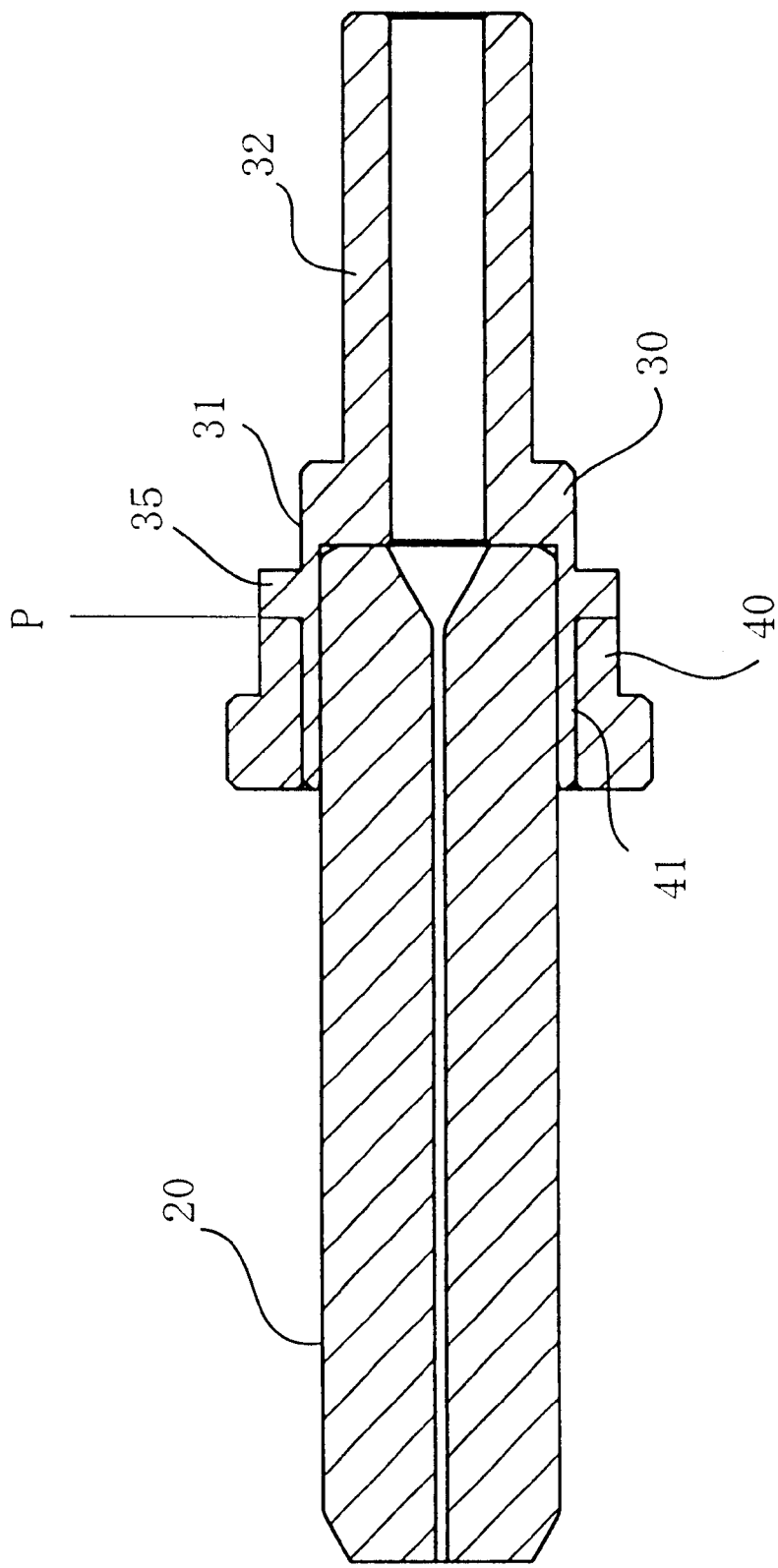
FIG. 11 is a sectional view taken along line 11—11 in FIG. 10.

FIG. 11 is a sectional view taken along the line 11—11 of FIG. 10. In FIG. 11, the holder 30 is fitted to the rear end of the ferrule tubular body 20, and the collar member 40 is fitted along the outer periphery of the holder 30 on the ferrule tubular body 20 side. Here, the flange 35 is placed at a position in the axial direction of the large diameter cylindrical portion 31 of the holder 30 between the center and the rear end thereof. The flange 35 is arranged so as to encircle the ferrule tubular body 20 along the outer periphery thereof.

An end of the flange 35 on the ferrule tubular body 20 side is in contact with the rear end of the collar member 40. The outer diameter of the flange 35 is the same as the outer diameter of the collar member 40, and they are welded to each other with YAG laser at a point P in the outer periphery thereof.

Figure 12:
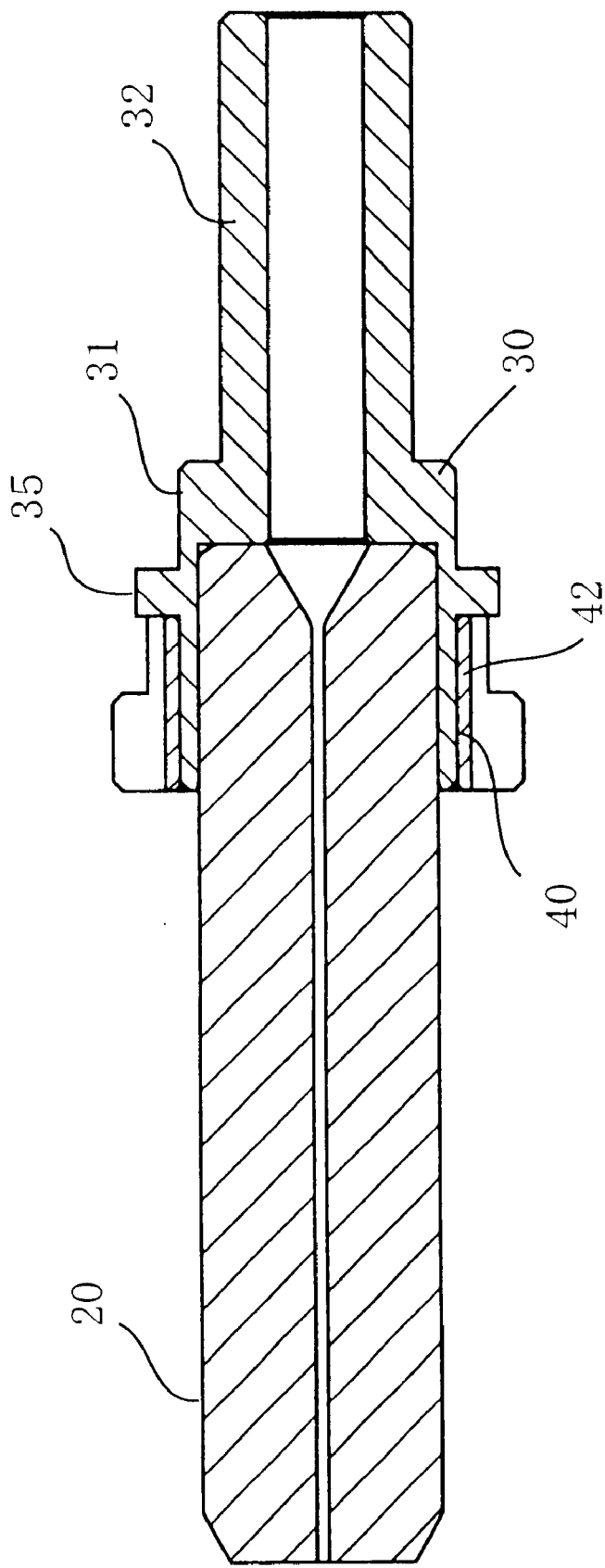
FIG. 12 is a sectional view taken along line 12—12 in FIG. 10.

FIG. 12 is a sectional view taken along the line 12—12 of FIG. 10. In FIG. 12, the inner surface of the large diameter cylindrical portion 31 of the holder 30 is fitted to the outer peripheral surface of the rear end of the ferrule tubular body 20. At this point, the large diameter cylindrical portion is arranged such that its frontal outer peripheral surface beyond the flange 35 faces the convex portions 42 of the collar member 40.

Described next is an assembling method for setting the optical fiber in the ferrule 10 in accordance with this embodiment. As in the embodiment described above with reference to FIGS. 1, 2 and 3A–3C, the holder is fitted to the rear end of the ferrule tubular body, and the optical fiber and the coated optical fiber are inserted into the optical fiber insertion hole and the coated optical fiber insertion hole, respectively. Thereafter the adhesive therein is cured to hold the optical fiber and the coated optical fiber in the ferrule tubular body and in the holder, respectively. Then the end face of the ferrule tubular body and the facet of the optical fiber are polished to have smooth mirror finished surfaces, followed by fixing the holder such that it can rotate axially.

Next, how to fix the collar member will be described. Discussed in here is one of polarization maintaining optical fibers, so-called a PNADA fiber (hereinafter referred to as a PMF fiber). It is needless to say, however, that the method can be applied also to ordinary optical fibers. First, the collar member is fixed using a jig. Then the ferrule tubular body and the holder in which the optical fiber and the coated optical fiber are bonded are inserted through the collar member from the front end of the ferrule tubular body first. In the following paragraphs, the adjustment of the position where the optical fiber is rotated will be described.

Figure 13:
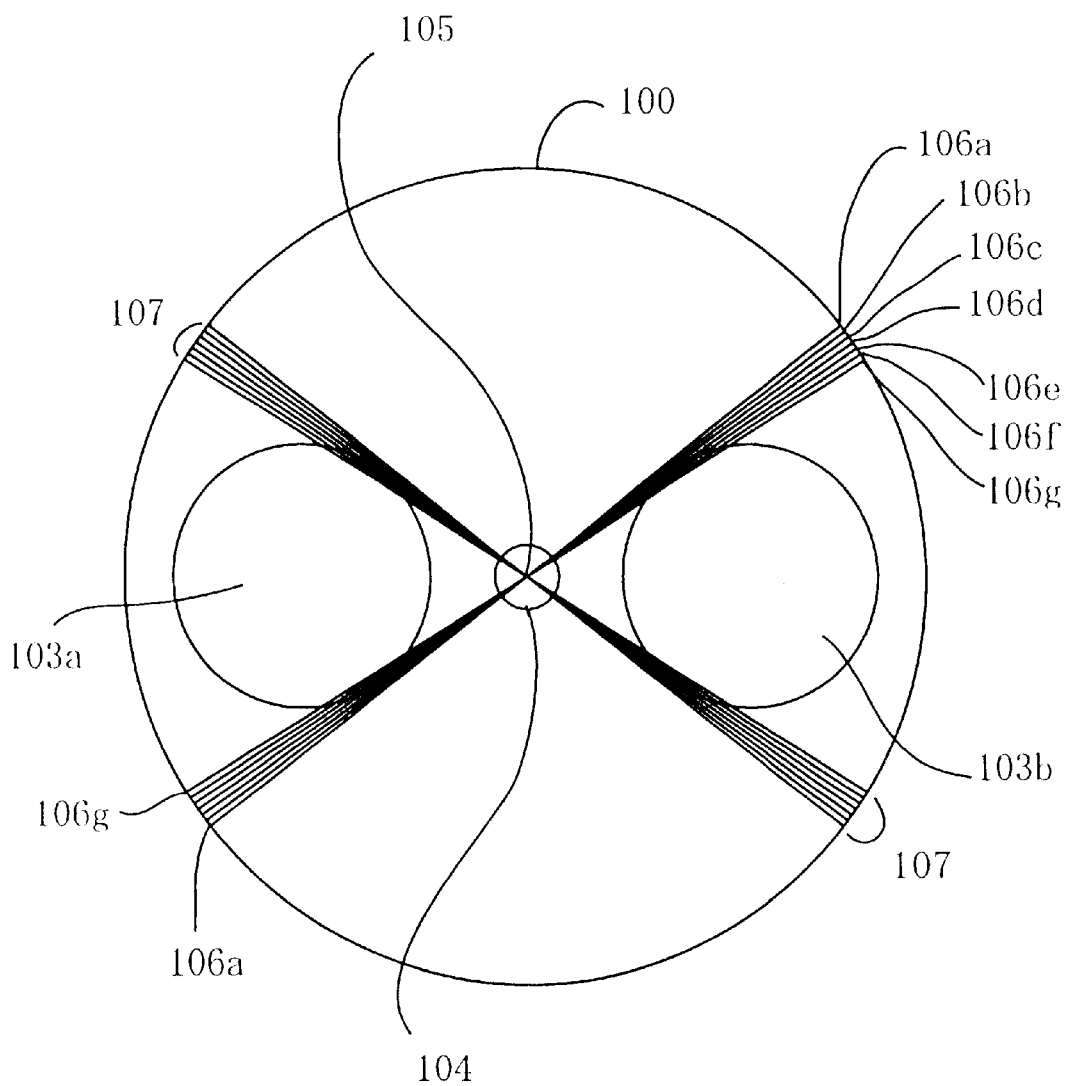
FIG. 13 is a plan view of the ferrule shown in FIG. 9.

FIG. 13 is a sectional view of the PMF, in which a core 104 is in the center of an optical fiber 100 and there are two stress imparting portions 103a and 103b for imparting stress to the core 104 to thereby maintain the plane of polarization of transmitted light, i.e., the vertical polarization.

Here, reference lines 106 and 107 are set in the measurement device 600f FIG. 4A, specifically, on an object glass of a microscope, or on a screen for displaying an image obtained through the microscope. The reference lines 106 and 107 are to obtain the principal axis of the PMF from a center 105 of the core 104 and from the line connecting the center of the stress imparting portions 103a and 103b. The reference line 106 includes lines 106a to 106g arranged such that they pass the center 105 and are each tangential to the stress imparting portions 103a and 103b spreading within a range of ±30° relative to the 0 degree reference line 106d. The reference line 107 similarly includes lines 107a to 107g. At least two straight lines intersecting each other at the center 105 of the core 104 are thus used as the reference lines, making it possible to obtain the correct principal axis even when the stress imparting portions 103a and 103b have different contours.

The reference lines 106 and 107 are not necessarily straight lines. They may be two groups of plural parabolas each passing the center 105 with the groups being vertically symmetrical in FIG. 12. Alternatively, they may be two symmetrical groups of plural hyperbolas with respect to the center 105. When parabolas or hyperbolas are employed as the reference, it is possible to detect the position of the outer periphery of one of the stress imparting portions 103 that is closer to the core 104. Therefore the principal axis can be detected more accurately.

The precision of the examination can also be increased by giving each of the plural reference lines 106 and 107 different color tone, making the 0 degree reference line 106d thicker than the rest of the reference lines, or the like.

In order to obtain the principle axis, a Nomarski differential interference microscope is used here for the measurement device 60. The use of the differential interference microscope facilitates observation of the outer peripheral shape of the stress imparting portions 103a and 103b and of the core 104 in FIG. 13. By arranging the stress imparting portions in a direction in which the sensitization of the microscope is increased, the contour of the stress imparting portions can be observed more clearly to enhance the precision in measuring the principal axis.

If an analyzer is used together with a polarizer serving as an illuminating device for the differential interference microscope, a color image can be obtained to facilitate judgement based on the visual observation.

The measurement device 60 may be a microscope other than the differential interference microscope, and a binocular stereoscopic microscope that utilizes coaxial or slant incident lighting may be used to observe the contour of the stress imparting portions. In this case, if a polarizing filter is added thereto, the observation is facilitated even more.

Another method is to use an STM scanning tunneling microscope in measuring the position and the shape of the outer periphery of the core and the stress imparting portions, to thereby calculate the position of the principal axis geometrically.

Still another option is as follows. A positioning mark is formed in the collar member on the ferrule tubular body end side, the position of the positioning mark is observed through a microscope, the end face of the ferrule is observed through the microscope to obtain the principal axis from the geometric position of the stress imparting portions and of the core, and the principle axis is aligned with the angle of the positioning mark by rotating the ferrule member, or by rotating the ferrule tubular body and the holder connected to the ferrule tubular body. In this case, a preferable microscope is a laser microscope that is capable of varying the focal distance in a wide range.

In this way, the collar member is fixed, the ferrule is inserted through the collar member and the principal axis is aligned with respect to the collar member. Thereafter, YAG laser is irradiated from the point P of FIG. 11 to make the principal axis coincide with the concave portion of the collar member. Here, the YAG laser may be split from the light source so that four points in the collar member where there is no concave portion are irradiated at the same time. As described above, the flange is provided at substantially the center of the large diameter cylindrical portion, the ferrule tubular body and the holder are inserted through the collar member from the ferrule tubular body first, the principal axis is confirmed, and laser irradiation is made while adjusting the angle of the collar member. This assembling method for setting the optical fiber in the ferrule can provide an optical connector with high keying precision.

At this point, the position of the stress imparting portions and of the core are confirmed by naked eyes, or the confirmation may automatically be conducted through image processing. In the latter case, an image is picked up, the noise is removed from the data thereof, and the image data is binarized through a method selected from the P-tile method, the mode method, the differential histogram method, the discriminant analysis method, and the variable threshold method. Then the image data is averaged by a method selected from the moving average method, median filtering, and the selective local average method to calculate the angle. Then the principal axis is aligned with the collar member before laser welding. When the angle of the principal axis is adjusted with respect to the collar member, image recognition is facilitated by using light incident on the optical fiber opposite to the ferrule to increase the contrast between the stress imparting portions and the core.

The methods described above utilize the geometric relation between the core and the stress imparting portions to detect the principal axis. However, it is also possible to adjust the principal axis with respect to the collar member by measuring actual optical characteristics, i.e., by measuring the extinction ratio. This alternative method will be described below.

The ferrule tubular body and the holder according to this embodiment are bonded to an end of the PMF, and connected thereto through a polarizer is a light source composed of an LD. The collar member is fixed in advance at a specific position relative to the polarizer, and the large diameter cylindrical portion is inserted through the collar member in a manner that allows the large diameter cylindrical portion to rotate. The other end of the PMF is connected through an analyzer to an optical power meter light intensity meter. The analyzer is connected to a rotation driving unit, so that the maximum value and the minimum value of the optical power by the rotation of the analyzer can be measured automatically. The large diameter cylindrical portion is rotated by a minute angle until the optical power ratio reaches the maximum, where the collar member is welded with laser. According to this method, the actual principal axis can be aligned in accordance with the extinction ratio. Therefore the method can contain the connection loss in PMF optical connectors to the minimum.

Other than the above, the principal axis can be measured also by observing light transmitted through the core with an SNOAM near-field optical microscope and the collar member can be welded as well. The SNOAM is further capable of measuring the stress distribution in the vicinity of the core, thereby enhancing the precision in detecting the principal axis.

Several embodiments of the present invention have been described as above. However, the basic structure of the ferrule and of the optical connector are not limited to the embodiments described above.

It is understood, for instance, that the optical connector for mounting the ferrule 10 of the present invention is not limited to the SC type optical connector of the embodiment described above with reference to FIGS. 1, 2 and 3A–3C but is applicable to an optical connector of FC type or the like.

With the optical connector having an improved keying precision as described above, the present invention can be applied to an optical fiber gyroscope, a magnetic field measuring device, a Mach-Zhnder fiber sensor, coherent optical communication parts, and a laser Doppler flowmeter.

As has been described, according to the ferrule and the optical connector of the present invention, the holder and the collar member are fixed to each other by welding or fusion. Therefore the position of the plane of polarization of the optical fiber held in the ferrule tubular body can readily be adjusted with respect to the position of the groove formed in the collar member, and the time required for assembly can be shortened as well. Moreover, the welding or the fusion provides strong joining to reduce the area needed for the joining. As a result, a connector of small diameter can be realized in which the area of the collar member is small.

What is claimed is:

1. A ferrule comprising:
a tubular body for supporting an end of an optical fiber having a coated end, the tubular body having a front end and a rear end;
a holder having a first end portion, a second end portion disposed at the rear end of the tubular body for supporting the coated end of the optical fiber, and a flange protruding from the second end portion; and
a collar member connected to the second end portion of the holder so that the flange of the holder restricts movement of the collar member towards the first end portion of the holder, the collar member having a positioning groove disposed at an outer peripheral surface thereof for positioning with respect to an optical connector housing.

2. A ferrule comprising:
a tubular body for supporting an end of an optical fiber having a coated end;
a metal holder disposed at a rear end of the tubular body for supporting a coated end of the optical fiber; and
a metal collar member having an inner peripheral surface welded to an outer peripheral surface of the metal holder and having a through-hole through which a portion of the metal holder extends and a positioning groove disposed at an outer peripheral surface thereof for positioning with respect to an optical connector housing.

3. A ferrule comprising:
a tubular body for supporting an end of an optical fiber having a coated end;
a metal holder disposed at a rear end of the tubular body for supporting a coated end of the optical fiber, the holder having a disc-shaped flange portion protruding from an outer peripheral surface thereof; and
a metal collar member having a peripheral edge welded to the flange portion of the metal holder and having a through-hole through which a portion of the metal holder extends and a positioning groove disposed at an outer peripheral surface thereof for positioning with respect to an optical connector housing.

4. A ferrule as claimed in claim 3; wherein the outer peripheral surface of the collar member and the outer peripheral surface of the holder are fixed to each other by welding.

5. A ferrule as claimed in claim 3; wherein the holder has a large diameter cylindrical portion for receiving an end of the tubular body, the flange portion being disposed substantially at a center of the large diameter cylindrical portion in a longitudinal direction of the holder; and wherein the collar member is fixed to the flange portion of the holder.

6. A ferrule as claimed in claim 3; wherein the flange portion of the holder protrudes from the outer peripheral surface thereof at an end of the holder connected to the tubular body; and wherein the collar member is fixed to the flange portion of the holder at the peripheral edge of the collar member disposed opposite to the ferrule tubular body.

7. A ferrule comprising:
a tubular body for supporting an end of an optical fiber having a coated end;
a holder disposed at a rear end of the tubular body for supporting a coated end of the optical fiber; and
a collar member connected to the holder and having a through-hole through which a portion of the holder extends and a positioning groove disposed at an outer peripheral surface thereof for positioning with respect to an optical connector housing;
wherein the holder and the collar member are formed of resin, the holder has a first tapered portion whose outer diameter gradually decreases toward a rear end thereof, the through hole of the collar member has a second tapered portion whose inner diameter gradually increases toward an opening of the through-hole into which the holder is inserted, and the first tapered portion of the holder and the second tapered portion of the collar member are fused together.

8. A ferrule as claimed in claim 1; wherein the optical fiber comprises a polarization maintaining-type optical fiber.

9. An optical connector having a ferrule according to claim 1.

10. A method of manufacturing a ferrule, comprising the steps of:
providing a holder having a first end portion, a second end portion, and a flange protruding from the second end portion;
fitting the holder to a rear end portion of a tubular body for holding an end of an optical fiber; and
connecting to the second end portion of the holder a collar member so that the flange of the holder restricts movement of the collar member towards the first end portion of the holder, the collar member having a through-hole through which the holder extends and a positioning groove at an outer peripheral surface thereof for positioning with respect to an optical connector housing.

11. A method of manufacturing a ferrule, comprising the steps of:
fitting a metal holder to a rear end portion of a tubular body for holding an end of an optical fiber; and
welding an outer peripheral surface of the metal holder to an inner peripheral surface of a metal collar member, the metal collar member having a through-hole through which the metal holder extends and having at an outer peripheral surface thereof a positioning groove for positioning with respect to an optical connector housing.

12. A method of manufacturing a ferrule, comprising the steps of:
providing a metal holder having a generally disc-shaped flange portion protruding along an outer peripheral surface thereof;
fitting the metal holder to a rear end portion of a tubular body for holding an end of an optical fiber; and
welding the disc-shaped flange portion of the metal holder to a peripheral edge of a metal collar member, the metal collar member having a through-hole through which the metal holder extends and having at an outer peripheral surface thereof a positioning groove for positioning with respect to an optical connector housing.

13. A method of manufacturing a ferrule as claimed in claim 12; wherein the connecting step includes the step of welding the outer peripheral surface of the collar member and the outer peripheral surface of the holder to each other.

14. A method of manufacturing a ferrule as claimed in claim 12; wherein the holder has a large diameter cylindrical portion, the flange portion being disposed at substantially the center of the large diameter cylindrical portion in an axial direction of the holder; and wherein the connecting step includes the step of inserting the flange portion of the holder into the through-hole of the collar member and welding the flange portion to the collar member.

15. A method of manufacturing a ferrule as claimed in claim 12; wherein the flange portion extends along the outer peripheral surface of the holder; and wherein the connecting step includes the step of inserting the flange portion of the holder into the through-hole of the collar member and welding the flange portion to the collar member.

16. A method of manufacturing a ferrule as claimed in claim 10; wherein the holder and the collar member are formed of resin, the holder has a first tapered portion whose outer diameter gradually decreases toward a rear end thereof, and the through-hole of the collar member has a second tapered portion whose inner diameter gradually increases toward an opening of the through-hole into which the holder is inserted; and wherein the connecting step includes the step of fusing the first tapered portion of the holder and the second tapered portion of the collar member to each other.

17. A method of assembling an optical fiber, comprising the steps of:
providing a holder having a first end portion, a second end portion, and a flange protruding from the second end portion;
fitting the holder to the rear end of a tubular body;
bonding an optical fiber in the tubular body;
polishing an end surface of the tubular body;
observing the tubular body through a microscope and adjusting an angle of rotation of the tubular body about a longitudinal axis of the optical fiber;
providing a collar member having a through-hole and a positioning groove for positioning with respect to an optical connector housing;
fitting the holder through the through-hole of the collar member; and
connecting the flange of the holder to the collar member so that the flange restricts movement of the collar member towards the first end portion of the holder.

18. A method of assembling an optical fiber as claimed in claim 17; wherein the adjusting step comprises adjusting the angle of rotation by transmitting light through the optical fiber.

19. A method of assembling an optical fiber as claimed in claim 17; wherein the optical fiber comprises a polarization maintaining-type optical fiber.

20. A method of assembling an optical fiber as claimed in claim 19; wherein the adjusting step comprises adjusting the angle of rotation in accordance with a position of a core of the optical fiber and positions of stress imparting portions of the optical fiber.

21. A method of assembling an optical fiber as claimed in claim 20; including the step of obtaining the positions of the core and the stress imparting portions of the optical fiber from a plurality of straight lines each of which is tangential to the stress imparting portions and which intersects with lines in the field of view of the microscope and from a position of a center of the core.

22. A method of assembling an optical fiber as claimed in claim 20; including the step of obtaining the positions of the core and the stress imparting portions of the optical fiber from a plurality of parabolic curves each of which is tangential to the stress imparting portions and which intersects with parabolic curves in the field of view of the microscope and from a position of a center of the core.

23. A method of assembling an optical fiber as claimed in claim 20; including the step of obtaining the positions of the core and the stress imparting portions of the optical fiber from a plurality of hyperbolic curves each of which is tangential to the stress imparting portions and which intersects with hyperbolic curves in the field of view of the microscope and from a position of a center of the core.

24. A method of assembling an optical fiber, comprising the steps of:
fitting a holder having a flange on its outer periphery to the rear end of a tubular body;
bonding an optical fiber in the tubular body;
polishing an end surface of the tubular body;
observing the tubular body through a microscope selected from the group consisting of a phase contrast microscope, a differential interference microscope, and a scanning tunneling microscope, and adjusting an angle of rotation of the tubular body about a longitudinal axis of the optical fiber; and connecting the flange of the holder to a collar member having a positioning groove for positioning with respect to an optical connector housing.

25. A method of assembling an optical fiber as claimed in claim 19; wherein the adjusting step comprises adjusting the angle of rotation in accordance with an image observed through the microscope and with a relative position of an angle formed by the collar member and a support portion.

26. A method of assembling an optical fiber, comprising the steps of:

fitting a holder having a flange on its outer periphery to a rear end portion of a tubular body;

bonding an optical fiber in the tubular body;

polishing an end surface of the tubular body;

adjusting an angle of rotation of the tubular body about a longitudinal axis of the optical fiber so that a maximum extinction ratio of transmission is obtained; and connecting the flange of the holder to a collar member.

27. A method of assembling an optical fiber, comprising the steps of:

fitting a holder having a flange on its outer periphery to a rear end portion of a tubular body;

bonding the optical fiber in the tubular body;

polishing an end surface of the tubular body;

disposing a collar member in a light source through a polarizer;

arranging, through an analyzer, an optical power meter in an end of the optical fiber which is not disposed in the tubular body;

adjusting an angle of rotation of the optical fiber about a longitudinal axis of the optical fiber in accordance with an output of the optical power meter; and connecting the flange of the holder to the collar member.

28. A method of assembling an optical fiber as claimed in claim 27; further comprising a step of rotating the analyzer to obtain an extinction ratio of transmission and adjust the angle of rotation of the optical fiber.

29. A method of manufacturing a ferrule, comprising the steps of:

fitting a holder to a rear end portion of a tubular body for holding an end of an optical fiber; and welding to the holder a collar member having a through-hole through which the holder extends, the collar member having at an outer peripheral surface thereof a positioning groove for positioning with respect to an optical connector housing.

30. A method of manufacturing a ferrule, comprising the steps of:

fitting a holder to a rear end portion of a tubular body for holding an end of an optical fiber; and fusing the holder with a collar member having a through-hole through which the holder extends, the collar member having at an outer peripheral surface thereof a positioning groove for positioning with respect to an optical connector housing.

31. A method of assembling an optical fiber, comprising the steps of:

fitting a holder having a flange on its outer periphery to the rear end of a tubular body;

bonding an optical fiber in the tubular body;

polishing an end surface of the tubular body;

observing the tubular body through a microscope and adjusting an angle of rotation of the tubular body about a longitudinal axis of the optical fiber; and welding the flange of the holder to a collar member having a positioning groove for positioning with respect to an optical connector housing.

32. A method of assembling an optical fiber, comprising the steps of:

fitting a holder having a flange on its outer periphery to the rear end of a tubular body;

bonding an optical fiber in the tubular body;

polishing an end surface of the tubular body;

observing the tubular body through a microscope and adjusting an angle of rotation of the tubular body about a longitudinal axis of the optical fiber; and fusing the flange of the holder with a collar member having a positioning groove for positioning with respect to an optical connector housing.

33. A method of assembling an optical fiber according to claim 26; wherein the connecting step comprises welding the flange of the holder to the collar member.

34. A method of assembling an optical fiber according to claim 26; wherein the connecting step comprises fusing the flange of the holder with the collar member.

35. A method of assembling an optical fiber according to claim 27; wherein the connecting step comprises welding the flange of the holder to the collar member.

36. A method of assembling an optical fiber according to claim 27; wherein the connecting step comprises fusing the flange of the holder with the collar member.

37. A method of assembling an optical fiber as claimed in claim 27; wherein the optical fiber comprises a polarization maintaining-type optical fiber.

* * * * *